United States Patent [19]

Burlingame

[11] Patent Number: 5,408,389
[45] Date of Patent: Apr. 18, 1995

[54] INTERRUPTED LIGHT SOURCE

[76] Inventor: Glen E. Burlingame, 2858 W. 55th St., Chicago, Ill. 60632

[21] Appl. No.: 116,350

[22] Filed: Sep. 7, 1993

[51] Int. Cl.⁶ ............................................. F21V 21/14
[52] U.S. Cl. ...................... 362/35; 362/284; 362/286; 362/287; 362/324
[58] Field of Search ............... 362/35, 282, 284, 286, 362/287, 322, 324; 313/113, 580

[56] References Cited

U.S. PATENT DOCUMENTS

| | | | |
|---|---|---|---|
| 1,232,741 | 7/1917 | West | 313/580 X |
| 2,936,387 | 5/1960 | Steele, Jr. et al. | 313/22 |
| 3,331,980 | 7/1967 | Michael | 313/113 |
| 3,633,161 | 1/1972 | Price | 340/133 |
| 4,054,791 | 10/1977 | Du Shane | 362/35 |
| 4,153,926 | 5/1979 | Hurt | 362/35 |
| 4,231,078 | 10/1980 | Hitora | 362/35 |
| 4,701,743 | 10/1987 | Pearlman et al. | 362/35 |
| 4,924,365 | 5/1990 | Bogdanovs | 362/282 X |
| 5,003,444 | 3/1991 | Secka et al. | 362/35 |
| 5,010,412 | 4/1991 | Garriss | 358/240 |

Primary Examiner—Ira S. Lazarus
Assistant Examiner—Thomas M. Sember
Attorney, Agent, or Firm—Gary M. Hartman; Domenica N. S. Hartman

[57] ABSTRACT

A device and method of operation are disclosed which provide an improved light source. The device and its mode of operation serve to substantially reduce the energy required to produce sufficient light for normal human vision. A mechanical embodiment of the device serves to concentrate the total output of a light source into one or more relatively small beams, then sweep the beams of light around or over an area to be illuminated for vision. Alternatively, an electrical approach can be employed to achieve substantially the same results as the mechanical approach. Because the light emitted by the light source is concentrated within one or more relatively small beams, the intermittent lighting effect of which is undetectable by the human eye, a significant reduction in energy consumption can be achieved in that a lower-powered light source can be employed to achieve an illumination level which is comparable to that of a much higher-powered light source.

16 Claims, 6 Drawing Sheets

INTERRUPTED LIGHT SOURCE

The present invention generally relates to illumination devices such as electric lamps used to provide artificial lighting. More particularly, this invention relates to illumination devices which emit light intermittently from the perspective of a stationary point of reference relative to the illumination device, yet concentrate and distribute the light in a manner which appears to the human eye to be constant. These illumination devices can be employed to provide artificial lighting for essentially any lighting application where light must be provided for human vision, while substantially reducing the energy required to produce an acceptable level of illuminance.

BACKGROUND OF THE INVENTION

Ancient Persians flipped a series of drawings on a thin flexible material, with the use of their hands, to create apparent motion in the figures and animals depicted on the material. Each picture was drawn in a slightly different position in stages of motion. It is a very old discovery, whose surprising result is still employed today in children's toys. The capacity to blend changing, different images smoothly into flowing motion has other modern uses as well. Motion pictures and television are examples of this form of perception, a phenomenon which is now known as the "persistence of vision", defined as the capacity of mechanisms associated with the eye and sight to retain the image of something seen after the removal of the stimulus that produced it.

This property of the eye interferes with the intended function of devices such as movie projectors and stroboscopes, which block light and rapidly extinguish light, respectively. In order not to allow awareness of change from frame to frame as a movie film is being moved through a projector, there is typically a shutter mechanism which interrupts light emitted by the projector's lamp between frame changes. In a typical projector, the shutter blocks the light approximately one third of the time. Yet, without film in the projector, the area of light projected on a surface through the lens appears unchanging and nearly of the same intensity.

In contrast, stroboscopes, such as those disclosed in U.S. Pat. No. 2,936,387 to Steele et al. and U.S. Pat. No. 3,633,161 to Price, produce a very brief interval of light which has the ability to produce the appearance of interrupted movement, or unconnected motion, to an observer. The period of darkness between bursts of light, and the length of each period of darkness relative to the duration of the burst of light, is intended to prevent the appearance of smooth motion by overcoming the persistence of vision effect. A commonly known application where this effect is utilized is when a strobe light is used to make dancers on a dance floor appear to move with a jerking and unconnected motion. In other applications, stroboscopes are employed to seemingly freeze motion. For example, machinery which have rotating or reciprocating parts can be illuminated with a short lived burst of light at the same frequency at which the part rotates or reciprocates into repetitive positions. When the frequency of light pulses matches the part's rate of rotation or reciprocation, the effect of ambient light is overcome and the part appears motionless, enabling its speed to be known. In effect, stroboscopes used for such purposes operate in a manner which overcomes the persistence of vision effect.

U.S. Pat. No. 5,010,410 to Garriss suggests that the capabilities of a stroboscope be utilized with video camera technology to produce an intermittent light whose frequency and duration coincide with the frequency with which a film frame is exposed when analyzing an object that is being inspected with the camera. In effect, the object is illuminated by sufficient light during the exposure of a frame such that the light intensity at certain locations on the object can be used to determine the shape of the object. The light source, in this case a number of light emitting diodes, is energized only while the camera is acquiring an image, and is thereafter off to minimize power consumption, heat and noise.

While the apparatus taught by Garriss achieves an effect in which, while viewing a film, a continuous image could be perceived by a viewer, the actual recording process operates in a manner which is contrary to the persistence of vision effect. Specifically, the video camera operates in a manner which forms one or more distinct individual images during filming, with the light source being on for a duration sufficient only for the camera to acquire an image. Consequently, each light cycle is dedicated to exposing the film, and does not serve to produce sufficient light at a frequency and for a duration which are necessary to produce the persistence of vision effect.

Each of the above examples are cited to distinguish devices which are intended to operate in a manner which serves to defeat the persistence of vision effect. However, modern examples do exist in which the persistence of vision effect is advantageously used to achieve an apparently continuous light at a substantially uniform intensity. For example, a television set scans a new picture approximately 60 times per second, with a small point of illumination. The picture is never there all at once, as the viewer perceives it to be, illustrating that constant light is not necessary to enable normal vision. However, the prior art is lacking in any suggestion that the persistence of vision effect can be utilized to produce adequate lighting for normal vision. Because a continuous light source is not necessary to produce the appearance of continuous light, the persistence of vision effect could be advantageously exploited to provide lighting which, although appearing to be continuous and conventional, is in fact intermittent, such that energy could be conserved. The potential for such an improvement would be highly desirable, particularly in view of the considerable activity in the area of light generation, and efforts to improve the life and efficiency of light sources.

Thus, it would be desirable to provide a device by which the persistence of vision effect is employed to produce artificial lighting. Such a device would operate by emitting light which is interrupted in some manner so as to allow the persistence of vision effect to provide an observer with the sensation that light is continuously and uniformly being emitted by the light source.

SUMMARY OF THE INVENTION

It is an object of this invention to provide an illumination device for emitting light of sufficient intensity to provide illuminance for numerous circumstances in which artificial lighting is required or desired to produce a suitable lighting level for the human eye.

It is a further object of this invention that such a device operate in a manner which exploits the persistence of vision effect, such that light being emitted from the device is not simultaneously and continuously being projected in every direction from the device.

It is another object of this invention that such a device produce light which is interrupted in a manner that enables an observer to perceive a continuous light source through the persistence of vision effect.

It is yet another object of this invention that such a device operate in a manner which selectively broadcasts light within a beam which is swept across or otherwise directed toward at least a portion of the environment in which the device is located, wherein the sweep rate is sufficient to create the persistence of vision effect.

In accordance with a preferred embodiment of this invention, these and other objects and advantages are accomplished as follows.

According to the present invention, there is provided an illumination device and a method for operating the illumination device so as to provide an improved light source which provides for normal vision while consuming significantly less power. The method serves to substantially reduce the duration, and thus the amount, of light which is required for normal human vision. The method of this invention may be accomplished using a mechanical apparatus or alternatively, an electrical apparatus. The mechanical approach serves to concentrate the total output of a light source into one or more relatively small beams of light, then sweeps these beams of light over an area to be illuminated. The electrical approach involves providing a light source that preferably has the capacity to reach peak intensity quickly when current is applied by a switching device. The light source is then rapidly interrupted by switching current on and off to either the light source or to selected portions of the light source, wherein the portions have appropriate lenses and/or reflecting elements to concentrate the light from these portions into one or more relatively small beams or areas and in a predetermined sequence for predetermined intervals.

Because the light emitted by the light source is concentrated within one or more relatively small beams of light, a significant reduction in energy consumption can be achieved in that a lower-powered light source can be employed to achieve an illumination level which is comparable to that of a much higher-powered light source. Concentrating the light within a smaller beam is possible in that this invention distributes the beam of light over the surrounding environment in a manner such that the interruption of light to any one particular area is undetectable by the human eye.

As noted previously, constant radiation of light from a light source is unnecessary for the human eye to perceive it as continuous, as a result of the persistence of vision effect. Accordingly, light emitted in excess of that amount required to achieve the persistence of vision effect is wasted. Consequently, this invention teaches a method by which an intermittent or interrupted light can be suitably used to produce what appears to be a continuous, uninterrupted light from a substantially conventional light source, such as a filament energized within a glass bulb. The effect of an illumination device which is properly operating in accordance with this invention is that the time over which a region is continuously illuminated by the device, and thus the total light received by the region being illuminated by the device, can be reduced to a minimum level corresponding to the physiological capability of the eye and brain to perceive the illumination as being uninterrupted. The advantage of interrupted light as opposed to constant and continuous light for vision is a significant cost and energy reduction in providing that light. Primarily then, an object of this invention is the physiological effect which such a light source has on the perception of vision, and not strictly the physical characteristics of the light source used, though some limitations are inherent with the operation required to achieve the desired effect.

As a result, an advantage of this invention is that the efficiency of practically all lighting sources may be improved by utilizing the teachings of this invention. More specifically, the teachings of this invention can be employed to improve the efficiency of current lighting sources, as well as those of the emerging technology as the active research in this technology makes it available. Generally then, the ability to improve efficiencies of a lighting source as taught by this invention is not limited to current lighting technology, but is foreseeably equally applicable to practically all future improvements in lighting technology.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

Figure 1:
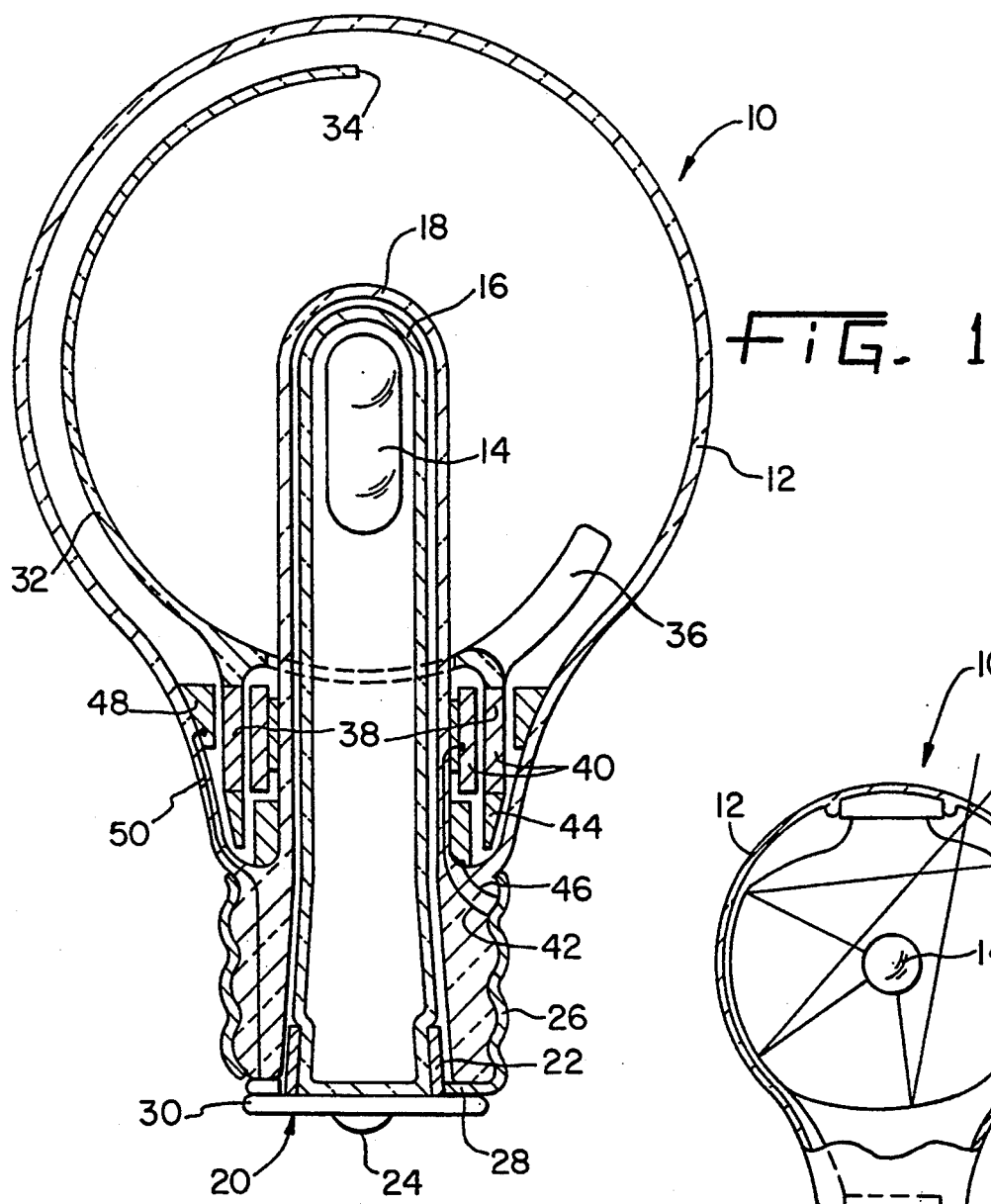
FIG. 1 shows in cross section an illumination device constructed in accordance with a first embodiment of this invention.

Illumination devices and a method for operating the illumination devices are disclosed. When operated in accordance with this invention, such an illumination device is capable of significantly reducing the energy required to suitably illuminate an area for activities which require artificial lighting, such as reading as well as numerous other tasks in which normal and comfortable vision is desirable. More specifically, this invention is directed to an illumination device which exploits the persistence of vision effect by broadcasting a beam of light intermittently with respect to a stationary point in the vicinity of the illumination device, such that it appears to the human eye that the light being emitted from the illumination device is continuous and uninterrupted, so as to permit normal and comfortable vision and sight.

Throughout the following description, reference will be made to the term "vision" which is intended to convey "normal" vision, as perceived by the human eye. Specifically, normal vision is made possible by an illuminance level which is sufficient for performing a given task requiring sight. Therefore, illumination devices which are intended for photography, video cameras, growing plants, conducting various chemical processes, and other uses which are not sight-related —i.e., the entity sensing the light is not the human eye, but rather mechanical devices or other entities which are not susceptible to the persistence of vision phenomenon, as is the human eye—are outside of the context of this invention. Furthermore, "artificial lighting" will be used to denote lighting which serves to enable normal vision by the human eye as a substitute, to some degree, for the sun. Accordingly, "artificial lighting" is used in contrast to illumination devices which are not intended for normal vision, such as stroboscopes and movie projectors.

Numerous embodiments, including those illustrated in the Figures, are possible and within the scope of this invention. While the Figures illustrate mechanical embodiments which are capable of providing illuminance which creates the persistence of vision effect, electronic methods and devices are also capable of achieving this same effect, as will be discussed more fully below. The mechanical embodiments are generally directed to two modes by which light that is being continuously emitted by a light source is focused within a beam by a reflector and/or lens, such that only a portion of the surroundings is illuminated by the light source at any given instant. The first mode involves continuously rotating a lens or reflector around the light source, while the second mode involves using a lens or reflector which rotates with the light source itself. Regardless of the structure adopted, the basic criterion for a device operating in accordance with this invention is to produce one or more beams of light which are manipulated to achieve the persistence of vision effect.

It is believed that such operation requires, from the perspective of a stationary position relative to the device, a burst of light emitted at least about 60 times per second. Generally, the width of the beam of light, as well as its intensity, the number of beams employed, and the frequency of rotation determine, and when correctly regulated, create conditions for normal vision in which perceptible flicker is absent. However, it should be noted that differences in the ability of individuals to be susceptible to the persistence of vision phenomenon could very well result in a higher minimum rate from that suggested here.

Referring specifically to FIG. 1, an illumination device 10 is depicted in accordance with a first embodiment of this invention. The illumination device 10 includes a glass bulb 12 which encloses a suitable light source 14, such as a smaller glass bulb containing an incandescent filament of the type often formed from tungsten. Preferably, the glass bulb 12 is evacuated. The light source 14 is enclosed within a glass tube 16 that is preferably removable from the bulb 12 so as to allow replacement of the light source 14 while allowing reuse of the remaining portions of the illumination device 10. The glass tube 16 is received within a glass receptacle 18 formed in the bulb 12. Access to the receptacle 18 is through the base 26 of the glass bulb 12. Both the glass tube 16 and the receptacle 18 are slightly tapered at their respective bases to help center the tube 16 within the receptacle 18, as well as enhance the stability of the assembly.

Attached to the base of the glass tube 16 is a base 20 having a brass ferrule 22 which secures the base 20 to the glass tube 16. The base 20 also includes a brass contact 24 by which electrical contact can be made with the center terminal of a light socket (not shown). The brass ferrule 22 contacts a lip 28 extending inwardly from the base 26 of the bulb 12 to conduct electricity from the peripheral terminal of the socket to the light source 14. The base 20 has an insulating ring 30 intermediate the contact 24 and the brass ferrule 22 to prevent shorting.

Figure 2A:
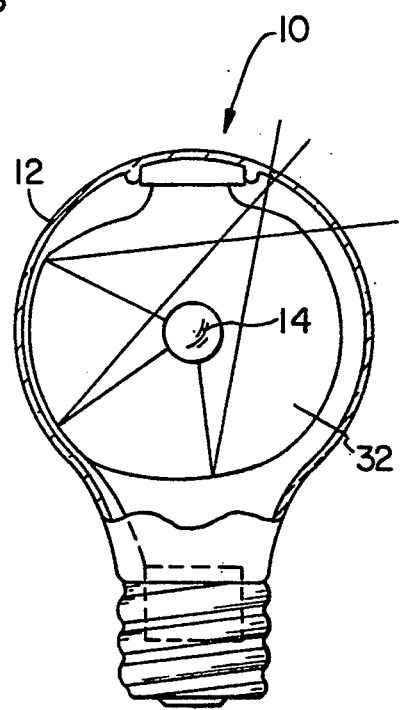
FIGS. 2a and 2b show in partial cross section a reflector of the type suitable to concentrate and focus light being emitted from a light source in accordance with the illumination device of FIG. 1.
Figure 2B:
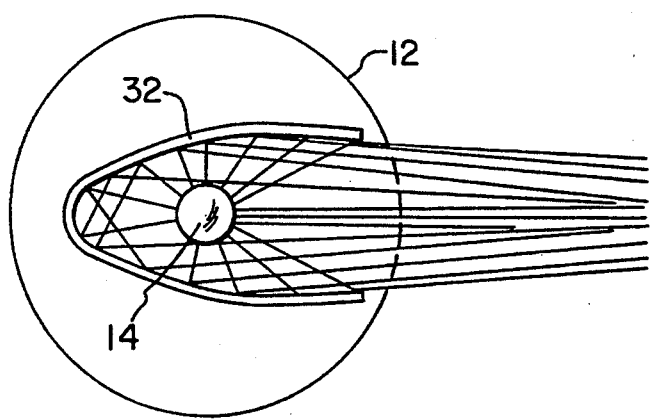

The illumination device 10 further includes a focusing member, shown here as a reflector 32 which partially circumscribes the light source 14. Preferably, the reflector 32 is composed of a suitably rigid though light weight material, such as a thermoplastic, a thermoset, glass or pyrex, and is coated with a reflective material, such as a vacuum-deposited aluminum coating, on its interior surface. As shown in FIG. 1, the reflector 32 is shaped to provide a large aperture 34 through which light emitted from the light source 14 is able to escape to the surroundings. As shown, the reflector 32 has a more or less hemispherical shape, such that the aperture 34 emits light within a beam defined by vertical and horizontal arcs of as much as about 180 degrees. However, as illustrated in FIGS. 2a and 2b, the shape of the reflector 32 may be varied widely to suitably affect the size and shape of the light beam which is permitted to escape from the illumination device 10 to the surroundings. In addition, facets can be provided on the interior surface of the reflector 32 in order to better concentrate the light through the aperture 34. Such a practice is suggested by FIG. 2b, which shows the angle of reflection of a beam of light being advantageously altered such that the beam of light is emitted through the aperture 34 with minimum internal reflection. The use of facets serves to enhance the efficiency of the illumination device 10 by minimizing losses through absorption by the reflector 32.

The reflector 32 is rotatably supported relative to the light source 14 so as to permit its rotation around the light source 14. As such, the beam of light which is permitted to escape from the illumination device 10 will be swept so that only a portion of the surroundings will be illuminated at any given instant, though substantially the entire surroundings will be illuminated during one complete revolution of the reflector 32. Because the reflector 32 may not have its weight uniformly distributed about its axis of rotation, a counterweight 36 is provided as required to counterbalance the inertial effect of the reflector 32.

The reflector 32 includes an extension 38 which provides a base by which the reflector 32 can be rotatably supported. Though numerous bearing supports could potentially be used, the reflector 32 is preferably supported by a magnetic bearing 40 of a type that is well known in the art, so as to minimize losses. As shown, one half of the magnetic bearing 40 is mounted to the extension 38, while the remaining half of the magnetic bearing 40 is secured to the glass receptacle 18. The magnetic bearing 40 is illustrated as being of the electromagnetic type, with a wire 42 supplying current from the base 26. However, a more preferable approach is for the bearing 40 to be of the permanent magnet type, so as to provide a continuous support for the reflector 32, even when current is not available through the base 26. Mechanical bearings (not shown) may be included to prevent damage to the moving parts of the illumination device 10 in the event that the device 10 is subjected to an impact or a sudden movement.

Rotation of the reflector 32 is made possible by a miniature electric motor 44 of a type known in the art. The motor 44 is illustrated as having its armature being mounted to the extension 38 and its stator mounted to an adjacent portion of the glass bulb 12. As with the magnetic bearings 40, the electricity necessary to operate the motor 44 is fed through wires 46 attached to the base 26 of the bulb 12 and the contact 24 formed on the base 20 of the glass tube 16. Because the magnetic bearings 40 allow for rotation of the reflector 32 with minimal frictional losses, particularly when the glass bulb 12 is evacuated as indicated above, minimal energy is required by the motor 44 to sustain rotation of the reflector 32.

To maintain the proper rate of rotation of the reflector 32, a magnetic speed sensor 48 is preferably provided to provide feedback to the motor 44. The sensor 48 is also energized with electricity fed through wires 50 attached to the base 26 and the contact 24. The energy required to maintain the reflector 32 rotating at a speed which is within a suitable range to produce the desired effect will generally be extremely low due to minimal frictional losses. Accordingly, the energy needed to maintain the reflector 32 in motion will be insignificant in comparison to the total energy expenditure for the light source 14, particularly since the reflector 32 will often be in a free spinning mode between the upper and lower rotational speed limits.

With the above structure, the reflector 32 is able to selectively focus or concentrate the light emitted by the light source 14 within a light beam projected at only a portion of the surroundings. The vertical arc of the light beam determines the upper and lower limits of the surroundings illuminated by the light source 14, while the horizontal arc of the light beam determines the degree to which the light is focused, and therefore concentrated. This concentrating effect enables a relatively small light source 14 to provide lighting capacity which is comparable to a much larger light source. Consequently, a smaller wattage light source, can effectively produce as much light as a much larger light source.

The speed at which the reflector 32 is rotated must be sufficient to evoke the persistence of vision effect when the illumination device 10 is observed by a person. The rate at which the reflector 32 must rotate depends in part on the horizontal arc of the beam defined by the aperture 34 formed by the reflector 32. Suitable speeds for various horizontal arcs can be readily ascertained with minimal experimentation by one skilled in the art. Primarily, the criterion for a successful relationship between rotational speed and horizontal arc is subjective, relying on a sensation perceived by an observer that light being emitted by the illumination device 10 is continuous and uniformly distributed over at least a portion of the surroundings, such that normal vision is possible.

Figure 3:
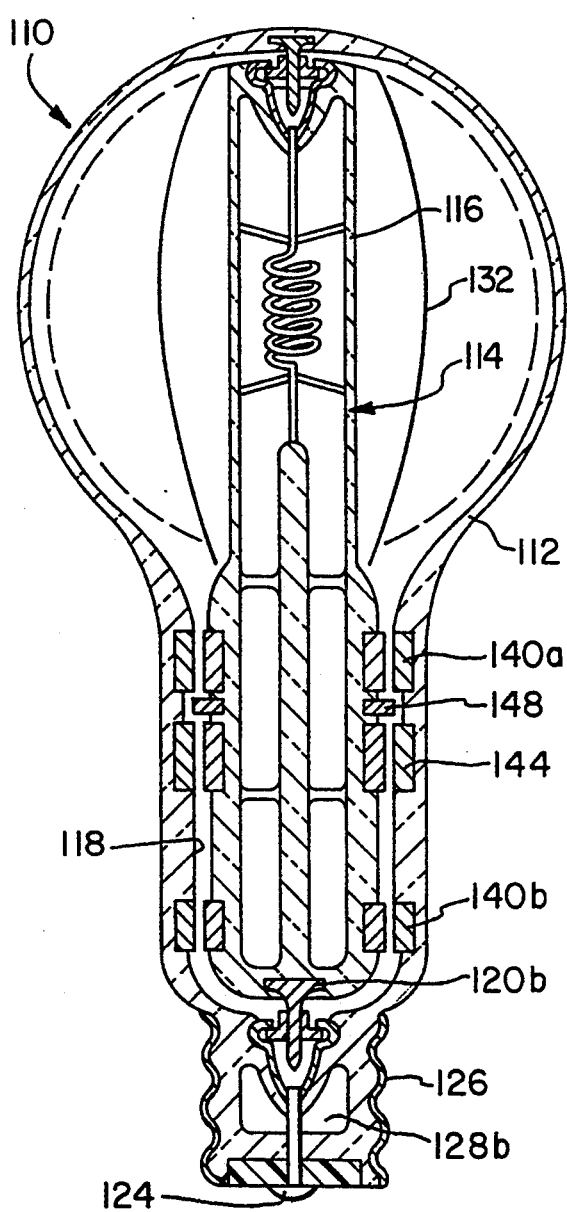
FIG. 3 shows in cross section an illumination device constructed in accordance with a second embodiment of this invention.
Figure 4:
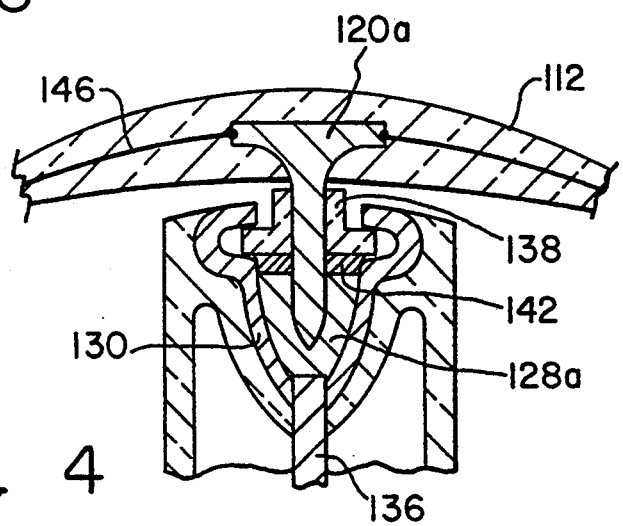
FIG. 4 shows in greater detail the electrical and support features of the embodiment shown in FIG. 3.

Referring now to FIGS. 3 and 4, an illumination device 110 is depicted in accordance with a second embodiment of this invention. In contrast to the first embodiment of FIG. 1, which relied on a stationary light source 14 around which a reflector 32 is rotated, the illumination device 110 of this embodiment involves rotating a light source 114 in conjunction with a focusing member, such as a reflector or lens 132, that does not move relative to the light source 114. Yet, the desired persistence of vision effect achieved by the first embodiment is also achieved in much the same manner with the second embodiment.

As with the first embodiment, the illumination device 110 includes a glass bulb 112 which encloses the light source 114. As before, it is preferable that the glass bulb 112 is evacuated to minimize losses due to friction. The light source 14 is composed of a glass tube 116 which is rotatably supported relative to the bulb 112 by a pair of magnetic bearings 140a and 140b, of the permanent magnet type described previously. The glass tube 116 is received within a receptacle 118 formed near the base of the bulb 112. As shown, one half of each magnetic bearing pair 140a and 140b is mounted to the glass tube 116, while the remaining half of each pair is secured to the wall of the receptacle 118. As before, rotational movement is made possible by a miniature electric motor 144 positioned intermediate the bearings 140a and 140b. Similar to the bearings 140a and 140b, the motor 144 is mounted to the glass tube 116 and an adjacent portion of the receptacle 118. To maintain the proper rate of rotation of the glass tube 116, a speed sensor 148 is again preferably used to provide feedback to the motor 144.

Positioned at the base of the glass tube 116 is a contact pin 120b which serves as one terminal for the light source 114 within the glass tube 116. As shown, the contact pin 120b is electrically connected to an external contact 124 at the base 126 of the glass bulb 112 by being extended into a reservoir of mercury 128b, which in turn is in electrical communication with the contact 124. Accordingly, electricity is supplied to the electrical components mounted to the glass tube 116 through wires (not shown) which are connected to the contact pin 120b.

At the upper end of the bulb 112, a similar electrical connection is provided, as shown in greater detail in FIG. 4. There, a second contact pin 120a is supported by the glass bulb 112 to extend through a sleeve 138 formed from teflon or another suitable polymeric material. The contact pin 120a extends into a second reservoir of mercury 128a defined by a metal cup 130 formed in the upper end of the glass tube 116. The mercury 128a is in direct contact with a metal terminal 136 secured within the glass tube 116, as shown. A fluid-tight seal is provided between the metal cup 130 and the sleeve 138 with a high temperature lubricant 142 so as to prevent mercury from escaping between the sleeve 138 and the contact pin 120a. A wire, and more preferably a number of wires 146, are embedded in the glass bulb 112 through which electricity is conducted from the base 126 of the bulb 112 to the contact pin 120a.

Figure 5A:
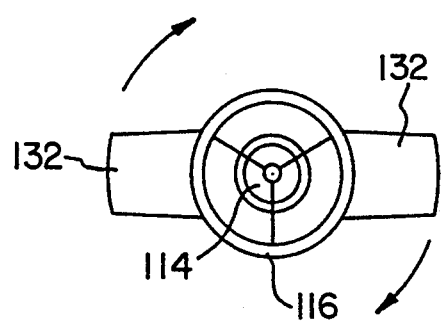
FIGS. 5a and 5b illustrate reflective lenses which are able to concentrate light into two and three beams of light, respectively, in accordance with the embodiment shown in FIG. 3.
Figure 5B:
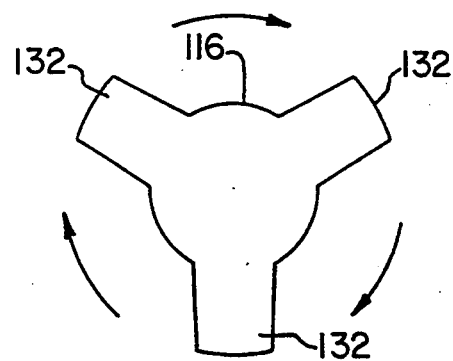

The illumination device 110 further includes two or more lenses 132 which project from the glass tube 116. As shown in FIG. 5a, a pair of oppositely disposed lenses 132 focus the light from the light source 114 in opposite directions. FIG. 5b illustrates an alternative approach in which three lenses 132 are provided. With each approach, each lens 132 focuses light which is emitted from the light source 114 within a corresponding light beam defined by a vertical arc of as much as about 180 degrees, and a horizontal arc of considerably less. However, with the approach illustrated in FIG. 5b, the rate at which the glass tube 116 must rotate to produce the persistence of vision effect is reduced by roughly one third, in that the time interval between each beam of light broadcast by successive lenses 132 is reduced.

As with the first embodiment of FIG. 1, the above structure enables the lenses 132 to selectively focus the light emitted by the light source 114 within two or more beams projected toward corresponding regions of the surroundings. The vertical arc of the beams determines the upper and lower limits of the surroundings illuminated by the light source 114, while the horizontal arc of the beams determines the degree to which the light is focused, and therefore concentrated. Again, this concentrating effect enables a relatively small light source 114 to provide lighting capacity which is comparable to a much larger light source.

Figure 6:
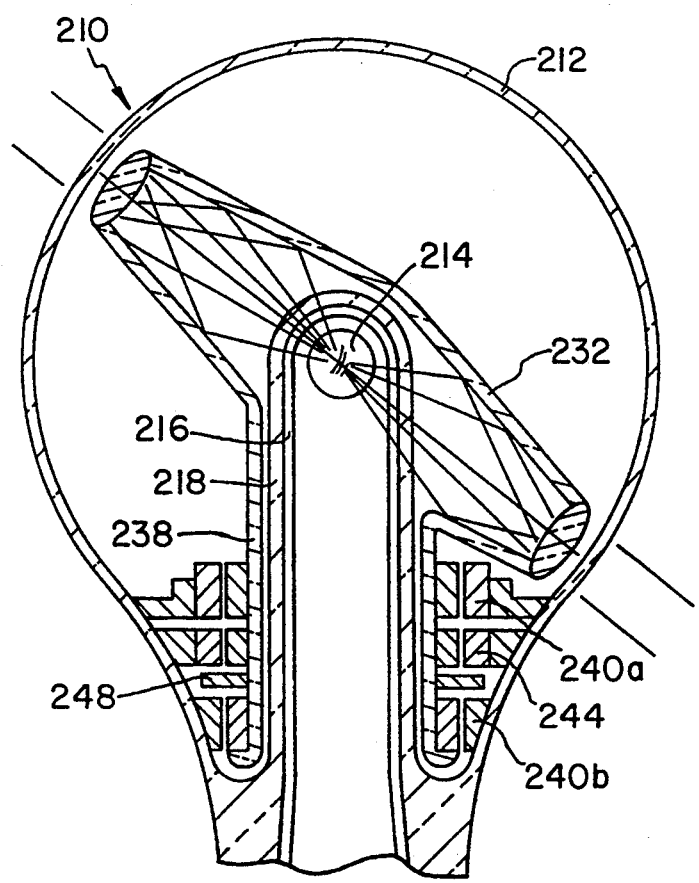
FIG. 6 shows in cross section an illumination device constructed in accordance with a third embodiment of this invention.
Figure 7:
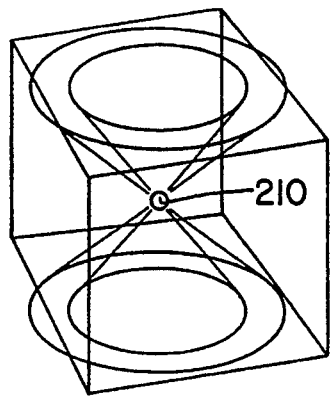
FIG. 7 shows an illumination pattern made possible by the illumination device of FIG. 6.

A third embodiment of this invention is illustrated in FIGS. 6 and 7. Similar to the first embodiment of FIG. 1, the illumination device 210 of this embodiment employs a stationary light source 214 around which a reflector/lens 232 is rotated. As with the first two embodiments, the illumination device 210 includes an evacuated glass bulb 212 which encloses the light source 214. The light source 214 is secured within a glass tube 216 which may be integrally formed with the glass bulb 212, or otherwise rigidly secured within the glass bulb 212. The glass tube 216 is received within a receptacle 218 formed or secured within the bulb 112.

As shown, the reflector/lens 232 serves to concentrate the light emitted by the light source 214 within a more intensely lit beam which illuminates a smaller portion of the surroundings than did the first two embodiments. The reflector/lens 232 is formed to have an interior reflective portion and an outside circular lens located at the end of a double-tapered, frustoconical shape. The reflective portion and the lens cooperate to focus the light into two shafts of concentrated light directed in substantially opposite directions. As the reflector/lens 232 rotates, each shaft of light generates a ring-shaped band of light, as illustrated in FIG. 7. The reflector/lens 232 has a tube-shaped extension 238 with which the reflector/lens 232 is rotatably supported relative to the bulb 212 and light source 214 by a pair of magnetic bearings 240a and 240b, as described in the earlier embodiments. As before, rotation of the reflector/lens 232 is made possible by a miniature electric motor 244 positioned intermediate the bearings 240a and 240b. A speed sensor 248 is again preferably used to provide feedback to the motor 244 in order to maintain the proper rate of rotation of the reflector/lens 232. Electrical connections (not shown) for the motor 244 and sensor 248, and to the bearings 240a and 240b if they are of the electromagnetic type, can be provided in a manner substantially similar to that shown previously.

Figure 8:
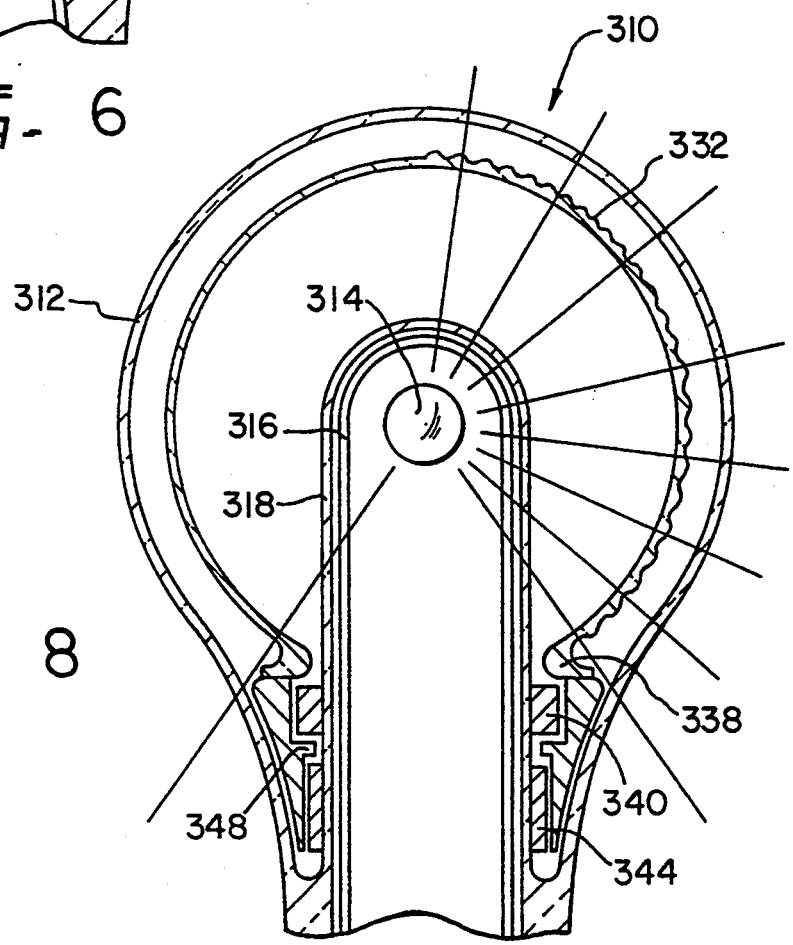
FIG. 8 shows in cross section an illumination device constructed in accordance with a fourth embodiment of this invention.
Figure 9:
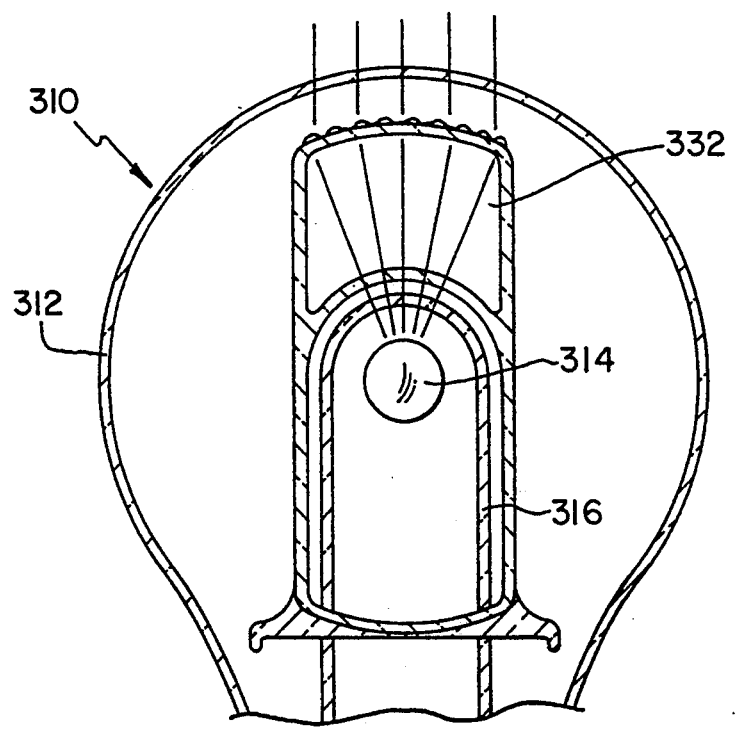
FIG. 9 shows a side view in partial cross section of the illumination device of FIG. 8.
Figure 10:
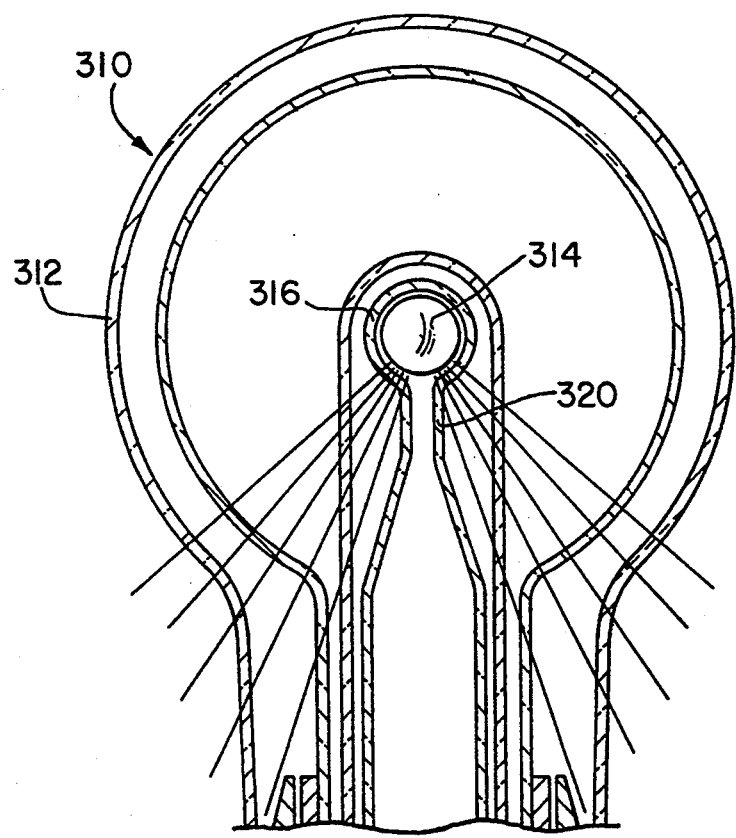
FIG. 10 shows in detail a preferred contour of a light source suitable for use with the illumination device of FIG. 8.

A fourth embodiment of this invention is illustrated in FIGS. 8, 9 and 10. Again, this embodiment operates in a manner similar to the first embodiment of FIG. 1, wherein the illumination device 310 of this embodiment employs a stationary light source 314 around which a focusing member, here a lens 332 formed with an interior reflective surface, is rotated. A light source 314 is enclosed within a glass tube 316 which is received within a receptacle 318 that is integrally formed or secured within an evacuated glass bulb 312. As before, the light source 314 and its glass tube 316 may be formed to be removable from the bulb 312 for replacement. As shown in FIGS. 8 and 9, the lens 332 is disc-shaped, and therefore serves to concentrate the light emitted by the light source 314 within a disc-shaped beam which is oriented to be substantially vertical. As the lens 332 rotates, the disc-shaped beam distributes light over substantially the entire surroundings. To maximize the distribution of the light, the glass tube 316 may be provided with a tapered lower portion 320 as shown in FIG. 10, so as to increase the amount of light directed in the vicinity of the base of the illumination device 310. As before, the lens 332 has a lower extension 338 with which the lens 332 is rotatably supported relative to the bulb 312 and light source 314 by a magnetic bearing 340. Rotation of the lens 332 is again made possible by a miniature electric motor 344 positioned adjacent the bearing 340, with a speed sensor 348 serving to provide feedback to the motor 344 in order to maintain an appropriate rate of rotation of the lens 332. Electrical connections (not shown) for the motor 344 and sensor 348 are provided in a manner substantially similar to that shown for the first embodiment in FIG. 1.

Figure 11:
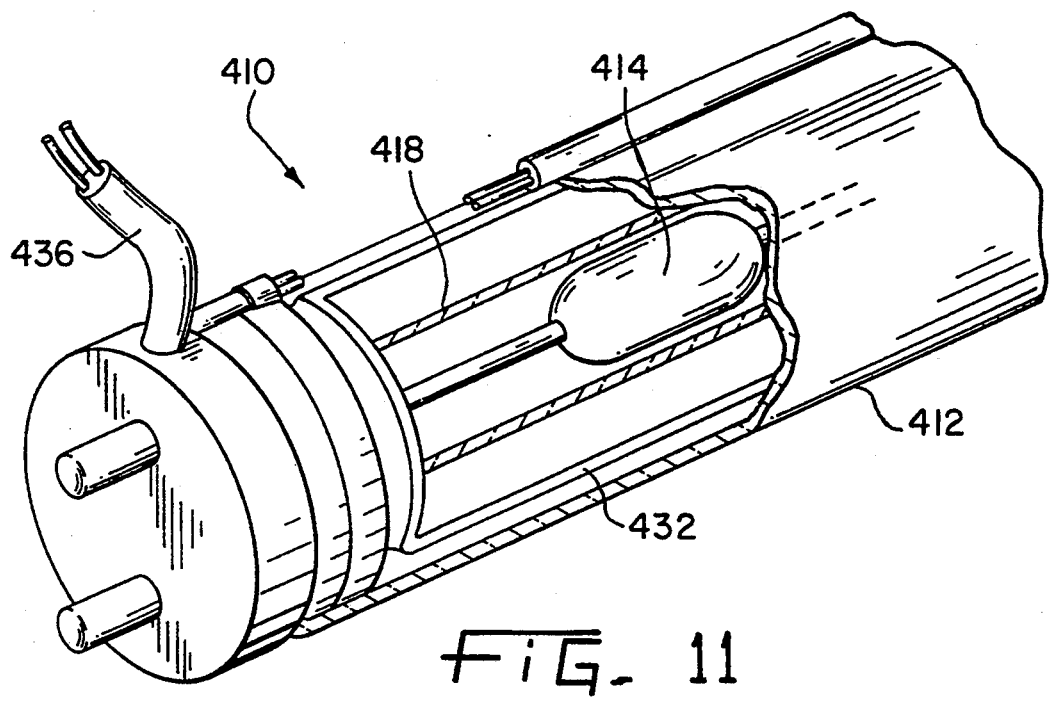
FIG. 11 shows in partial cross section an illumination device constructed in accordance with a fifth embodiment of this invention.
Figure 12:
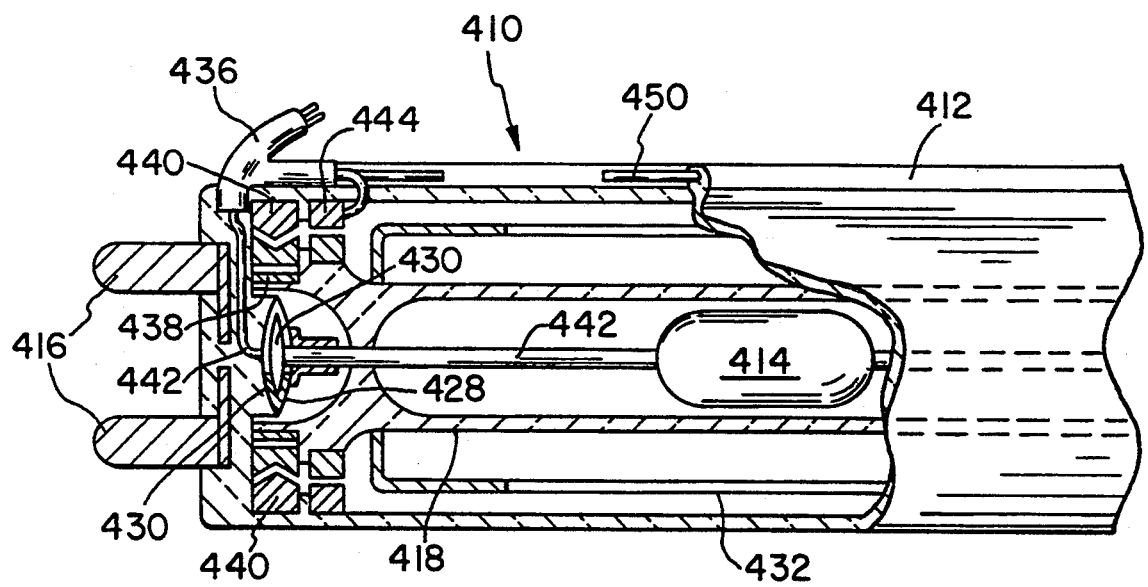
FIG. 12 shows a side view in cross section of the illumination device of FIG. 11.

A fifth embodiment of this invention is directed to a fluorescent lighting fixture, as illustrated in FIGS. 11 and 12. This embodiment operates in a manner similar to the second embodiment of FIG. 3, in that the illumination device 410 of this embodiment employs a light source 414 which rotates with a lens or reflector, or a combination of the two 432. The light source 414, which as shown is not a fluorescent lamp but an incandescent lamp, is enclosed within an evacuated glass tube 418 which is housed within an elongated bulb 412 sized to fit a standard fluorescent light fixture (not shown). The lens/reflector 432 also has an elongated shape in order to distribute the light emitted from the light source 414 along the entire length of the illumination device 410. Again, the lens/reflector 432 serves to concentrate the light emitted by the light source 414 within one or more beams which rotate about the axis of the bulb 412.

Also similar to the second embodiment, the lens/reflector 432 and light source 414 must be rotatably supported so as to enable electricity to be delivered to the light source 414. Due to the different operating requirements of a fluorescent light, including the need for ballast and either a rapid-start or preheat circuit, the illumination device 410 of this invention requires that a fluorescent fixture be modified to accept its incandescent light source 414. More specifically, the ballast and rapid-start or preheat circuits must be bypassed (not shown) to allow current to flow directly to the illumination device 410 through the terminal pins 416 conventionally provided with a fluorescent lamp, or the terminal pins 416 must be electrically isolated and an auxiliary connection 436 be installed to provide current from the incoming wiring for the fluorescent fixture directly to the illumination device 410, as shown in FIGS. 11 and 12. With either configuration, a dynamic electrical contact, such as the mercury contact shown in FIG. 3, must be used to provide electricity to the revolving light source 414.

The glass tube 418 serves as the primary support element for the moving components of the illumination device 410, including the lens/reflector 432 and the light source 414. Each end of the glass tube 418 (one end of which is shown in FIG. 12) is rotatably supported by a permanent magnet bearing 440. Additional bearings 440 may also be provided at intermediate points along the length of the glass tube 418, as deemed necessary. Rotation of the lens 332 is again made possible by a miniature electric motor 444 positioned adjacent the bearing 440, with a speed sensor 448 serving to provide feedback to the motor 444 in order to maintain the proper rate of rotation of the lens/reflector 432.

The electrical connections for the motor 444 and sensor 448 are provided in a manner substantially similar to that shown for the second embodiment in FIG. 3. An electrical lead 424 conducts electricity to a metal reservoir 430 provided at one end of the illumination device 410. Contained within the metal reservoir 430 is a quantity of mercury 428. A disc-shaped contact 430 is suspended within the reservoir 430 by a shaft 442 within which an electrical lead (not shown) is provided to conduct electricity from the contact 430 to the light source 414. Current is conducted away from the light source 414 through a second electrical lead 450 embedded in the bulb 412.

In each of the above mechanical embodiments, it is anticipated that the reflector and/or lens will be in a free spinning mode most of the time during the operation of the light source as a result of minimal frictional losses. Since there is some variation in the speed range of the reflector and/or lens that will still allow the persistence of vision effect to continue, the motor will only bring the spinning member up to the required speed when it drops below a predetermined lower limit.

Figure 13:
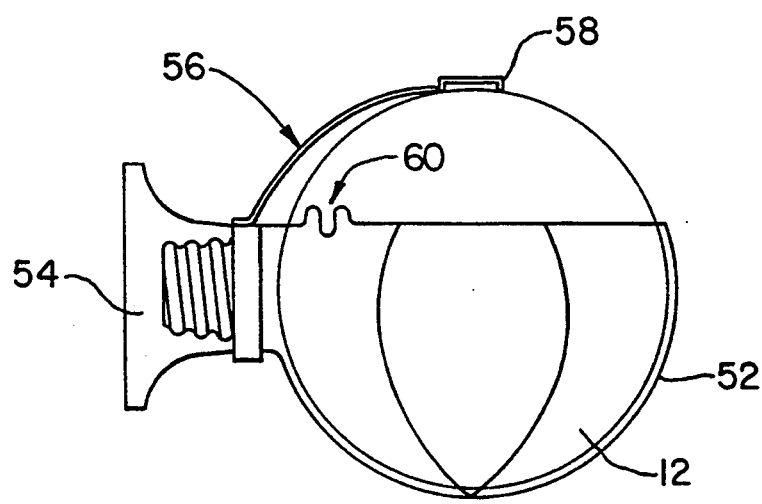
FIG. 13 shows a support device by which an illumination device in accordance with this invention may be supported from a vertical mounting surface.
Figure 14:
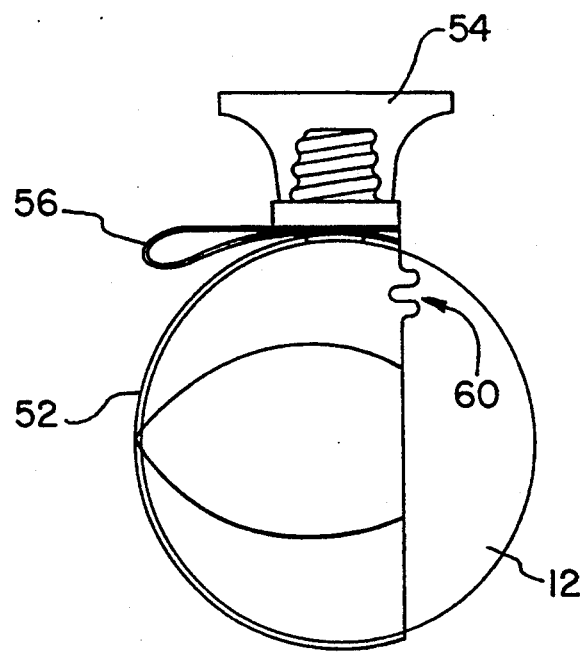
FIG. 14 shows the support device of FIG. 13 wherein an illumination device in accordance with this invention may be supported from a vertical surface.

FIGS. 13 and 14 illustrate a support device 52 which can be employed to support any one of the above illumination devices for purposes of enabling their rotating components to rotate about a substantially vertical axis. The support device 52 preferably consists of a wire or other filament-type structure which can support the bulb 12 of the illumination device from a fixture 54 attached to a vertical or horizontal surface, as shown in FIGS. 13 and 14, respectively, or an inclined surface (not shown). A current supply cable 56 is included to allow the illumination device to be rotated within the support device 52 without affecting current flow to the illumination device through a suitable terminal assembly 58. Preferably, the support device 52 includes relief segments 60 which allow the support device 52 to be slightly expanded as required to accommodate the bulb 12 of the illumination device. The use of such a support device 52 may foreseeably be advantageous in order to provide a preferred distribution of light, or to allow the use of support bearings which support the rotating components only from below.

It has been determined experimentally that an illumination device constructed to operate as described above is capable of producing a lighting level which is sufficient for typical activities, but with a substantially lower-powered light source. More specifically, the illumination method taught by this invention serves to substantially reduce the amount and duration of light which is required for normal human vision by concentrating the total output of a light source into one or more relatively small beams, then distributing the beams of light around or over an area to be illuminated for vision. Because the light emitted by the light source is concentrated within a relatively small beam, a significant reduction in energy consumption is achieved in that a lower-powered light source can be employed to achieve an illuminance level comparable to that of a much higher-powered light source. The reflectors and lenses serve to conserve the light emitted by the light source. The rate at which the beam or beams of light are swept presents an intermittent lighting effect which, when at a sufficiently high rate, is undetectable by the human eye, in accordance with the persistence of vision phenomenon described previously.

Accordingly, the present invention operates on the basis that constant radiation of light directed uniformly and simultaneously over the entire surroundings of a lighting source is unnecessary for the human eye to perceive it as continuous. In effect, this invention conserves the light which is in excess of that required to achieve the persistence of vision effect. The effect of an illumination device which is properly operating in accordance with this invention is that the time over which a region is continuously illuminated by the device, and thus the total light received by the region being illuminated by the device, can be reduced to a minimum level corresponding to the physiological capability of the eye and brain to perceive the illumination as being uninterrupted. As a result, the efficiency of many lighting fixtures used to light buildings and other areas used by persons can be improved by adopting the method of this invention.

It should be noted that the advantages associated with the lighting method of this invention are most apparent when applied to providing lighting for human sight, in that the persistence of vision effect is generally inapplicable to photographic and various other light-related devices. Specifically, the absence of a continuous image received by the eye is automatically compensated for by the brain. However, inanimate devices obviously do not have such a capability, and would therefore require synchronization with an illumination device which operates intermittently, a requirement completely contrary to the scope and object of this invention.

It should also be noted that, while the embodiments illustrated in the Figures are directed toward mechanical devices which operate in accordance with this invention, electronic circuitry can be appropriately substituted by one skilled in the art, such that the structural components required for the mechanical interruption of the light can be eliminated. Particularly, the teachings of this invention could be employed to design electronic devices which could achieve the same persistence of vision effect as that achieved by the mechanical embodiments illustrated in the Figures. For example, electronic switching could be employed with an illumination device which is similar to that shown in FIGS. 1 and 3, but modified to include a number of individual light sources or a single light source divided into segments, each of which can be individually energized to produce a burst of light for a predetermined duration and at a predetermined frequency. Preferably, the individual light sources or segments would each have a dedicated reflector or lens which concentrates and/or directs the light emitted thereby within a beam that will illuminate a portion of the surroundings. The sequence of these bursts of light and the spacial relationship between the regions to be lighted by each sequentially energized source or segment can vary widely, according to the particular application. Consequently, the effective rate at which the illumination devise emits light relative to a stationary observer in the vicinity of the device may also vary considerably. A sweeping beam of light made possible by the mechanical embodiments disclosed in the Figures can also be duplicated to some extent by individual light bursts directed in a circular sequence, though random patterns may also be suitably effective in illuminating a region with interrupted but sufficient light for normal vision.

Generally, the ability to effectively achieve the persistence of vision effect through electronic methods, as opposed to the mechanical methods illustrated in the Figures, is largely limited by the element producing the light. While xenon light sources used in stroboscopes are able to rapidly produce a suitable level of light, conventional incandescent light sources attain a suitable illumination level relatively slowly, such that rapid energizing and de-energizing of a single incandescent light source will typically be insufficient to create the persistence of vision effect that is the object of this invention. Consequently, guidance in the selection of a light source will rely in part on the requirement for a very rapid production of relatively intense light impulses, the advantages of using light sources able to use a standard voltage, and the ability to overcome potential cooling problems, among others. Yet, present technology in solid state switching devices suggests that potential problems which complicate the design of a suitable electronic device are solvable.

Therefore, while our invention has been described in terms of a preferred embodiment, it is apparent that other forms could be adopted by one skilled in the art; for example, by substituting electronic devices for the mechanical devices in order to produce the persistence of vision effect intended by this invention, or by modifying the illumination devices illustrated in the Figures by altering the type of light source used, the type and shape of the element used to interrupt and/or focus the light emitted from the light source, the manner in which the element and the light source are moved relative to each other, and the general shape and construction of the illumination device. Accordingly, the scope of our invention is to be limited only by the following claims.

The embodiments of the invention in which an exclusive property or privilege is claimed are defined as follows:

1. A device for providing artificial lighting, wherein the device emits light that is intermittent from the perspective of a stationary point of reference relative to the illumination device, yet appears to be continuous and uniform to a person observing from the stationary point of reference, the device comprising:
   an evacuated glass bulb;
   means disposed within the glass bulb for generating the light, the light generating means being removable from the glass bulb;
   means disposed within the glass bulb for interrupting the light from the perspective of the stationary point of reference, the interruption occurring at a rate and persisting for a duration such that the light appears to be continuously emitted from the light generating means from the perspective of the person observing from the stationary point of reference;
   means associated with the interrupting means for sensing the rate of interruption; and
   means associated with the sensing means for producing a feedback signal to the interrupting means.

2. A device as recited in claim 1 wherein the interrupting means comprises a rotating member which partially circumscribes and rotates around the light generating means.

3. A device as recited in claim 1 wherein the interrupting means directs the light emitted by the light generating means within a predetermined sector of as much as about 180 degrees.

4. A device as recited in claim 1 wherein the interrupting means and the light generating means are supported so as to be rotatable together.

5. A device as recited in claim 1 further comprising electrical means for rotating the interrupting means about the light generating means so as to establish the rate and duration at which the interruption occurs.

6. A device for providing artificial lighting, wherein the device emits light that is intermittent from the perspective of a stationary point of reference relative to the illumination device, yet appears to be continuous and uniform to a person observing from the stationary point of reference, the device comprising:
   an evacuated glass bulb;
   means disposed within the glass bulb for generating the light, the light generating means being removable from the glass bulb;
   rotating means disposed within the glass bulb for interrupting the light from the perspective of the stationary point of reference so as to interrupt a portion of the light and reflect the portion of the light in a direction which is substantially coincident with light emitted from the light generating means that is not interrupted by the rotating means, the interruption occurring at a rate and persisting for a duration such that the light appears to be continuously emitted from the light generating means from the perspective of the person observing from the stationary point of reference;
   means associated with the rotating means for sensing the rate of rotation of the rotating means; and
   means associated with the sensing means for producing a feedback signal to the rotating means.

7. A device as recited in claim 6 wherein the rotating means comprises a reflector which partially circumscribes and rotates around the light generating means.

8. A device as recited in claim 6 wherein the rotating means comprises at least one lens.

9. A device as recited in claim 6 wherein the rotating means and the light generating means are rotatable together.

10. A device as recited in claim 6 further comprising electrical means for rotating the rotating means about the light generating means so as to establish the rate and duration at which the interruption occurs.

11. A device as recited in claim 6 wherein the rotating means comprises a reflective surface on which facets are provided.

12. A device as recited in claim 6 wherein the device further comprises a magnetic bearing supporting the rotating means.

13. A method for emitting light from an artificial light source, wherein the light is intermittent from the perspective of a stationary point of reference relative to the artificial light source, yet appears to be continuous and uniform to a person observing from the stationary point of reference, the method comprising the steps of:

providing an evacuated glass bulb in which a light generating element is disposed for generating the light, the light generating element being removable from the glass bulb;

generating the light with the light generating element;

interrupting at least a portion of the light from the perspective of the stationary point of reference, the interruption occurring at a rate and persisting for a duration such that the light appears to be continuously emitted from the perspective of the person observing from the stationary point of reference;

sensing the rate of interruption; and producing a feedback signal in order to maintain the rate of interruption within a predetermined range.

14. A method as recited in claim 13 wherein the step of interrupting includes interrupting the at least a portion of the light with a rotating member which partially circumscribes and rotates around the light generating element.

15. A method as recited in claim 13 further comprising the step of focusing the light emitted by the light generating element within a predetermined sector of as much as about 180 degrees.

16. A method as recited in claim 13 wherein the step of interrupting includes rotating a rotating member about the light generating element with an electric motor so as to establish a rate of rotation of the focusing element which corresponds to the rate and duration for which the interruption occurs.

* * * * *